(12) United States Patent
Blevins et al.

(10) Patent No.: US 11,774,036 B2
(45) Date of Patent: Oct. 3, 2023

(54) DEVICE FOR HOLDING PORTABLE ELECTRONICS

(71) Applicant: NBRYTE, LLC, Houston, TX (US)

(72) Inventors: Conrad Scott Blevins, Houston, TX (US); Greg Thune, Los Angeles, CA (US); Daniel Michel, Diamond Bar, CA (US); Brian Vanhiel, Smyrna, GA (US); Chris Ruf, Sandy Springs, GA (US)

(73) Assignee: NBRYTE, LLC, Houston, TX (US)

( * ) Notice: Subject to any disclaimer, the term of this patent is extended or adjusted under 35 U.S.C. 154(b) by 0 days.

(21) Appl. No.: 17/761,842

(22) PCT Filed: Sep. 21, 2020

(86) PCT No.: PCT/US2020/051850
§ 371 (c)(1),
(2) Date: Mar. 18, 2022

(87) PCT Pub. No.: WO2021/055971
PCT Pub. Date: Mar. 25, 2021

(65) Prior Publication Data
US 2022/0325849 A1    Oct. 13, 2022

Related U.S. Application Data

(60) Provisional application No. 62/903,357, filed on Sep. 20, 2019.

(51) Int. Cl.
*F16M 11/38* (2006.01)
(52) U.S. Cl.
CPC ................... *F16M 11/38* (2013.01)

(58) Field of Classification Search
USPC .... 248/441.1, 458, 460, 461, 463, 464, 447, 248/444, 136, 133, 139, 140, 142, 150,
(Continued)

(56) References Cited

U.S. PATENT DOCUMENTS 3,669,227 A * 6/1972 Alford ................... A47B 97/08
                                                                312/231
4,149,763 A * 4/1979 Delahaie ................ A47B 97/08
                                                                312/231
(Continued)

OTHER PUBLICATIONS

WIPO, International Search Report and Written Opinion for PCT/US2020/051850, dated Dec. 15, 2020.

*Primary Examiner* — Alfred J Wujciak
(74) *Attorney, Agent, or Firm* — Hodgson Russ LLP

(57) ABSTRACT

The present disclosure provides a device for holding portable electronics. The device may include a base, a plurality of legs rotatably connected to the base, and a platform rotatably connected to the base via at least one first hinge. The platform may be configured to receive an electronic device and to pivot about the at least one first hinge between a level position and an inclined position. The device of the present disclosure may further include a retractable grip connected to the platform and configured to move between a retracted position and an extended position outside of the platform. In the extended position, at least one contact of the retractable grip may be configured to provide a bias force to an upper surface of the electronic device, such that at least a portion of the electronic device is disposed between the platform and the at least one contact.

18 Claims, 21 Drawing Sheets

(58) Field of Classification Search
USPC .......... 248/155.4, 371, 163.1, 165, 166, 170
See application file for complete search history.

(56) References Cited

U.S. PATENT DOCUMENTS

| | | | | |
|---|---|---|---|---|
| 5,671,900 | A | 9/1997 | Cutler | |
| 5,833,201 | A * | 11/1998 | Graybill | A47B 97/08 |
| | | | | 248/460 |
| 8,322,292 | B2 * | 12/2012 | Chen | A47B 23/043 |
| | | | | 248/463 |
| 2001/0048059 | A1 * | 12/2001 | Jones, II | A47B 97/08 |
| | | | | 248/161 |
| 2004/0007651 | A1 | 1/2004 | Williams et al. | |
| 2005/0284790 | A1 * | 12/2005 | Gordils | A45C 11/00 |
| | | | | 206/521 |
| 2006/0278770 | A1 | 12/2006 | MacLeod | |
| 2007/0012827 | A1 | 1/2007 | Fu et al. | |
| 2007/0145205 | A1 * | 6/2007 | Liang | F16M 11/32 |
| | | | | 248/163.1 |
| 2008/0149802 | A1 * | 6/2008 | Chiang | A47B 3/083 |
| | | | | 248/463 |
| 2016/0316905 | A1 | 11/2016 | Olander | |
| 2019/0183711 | A1 * | 6/2019 | Sevadjian | A47B 3/06 |

\* cited by examiner

DEVICE FOR HOLDING PORTABLE ELECTRONICS

CROSS-REFERENCE TO RELATED APPLICATION

This application is a U.S. national stage entry of International Patent Application No. PCT/US2020/051850, filed Sep. 21, 2020, which claims priority to U.S. Provisional Application No. 62/903,357, filed Sep. 20, 2019, the entire disclosures of which are incorporated herein by reference.

FIELD OF THE DISCLOSURE

This disclosure relates to devices capable of holding portable electronics and, more particularly, to a laptop stand.

BACKGROUND OF THE DISCLOSURE

Generally speaking, laptop users use their laptops in three primary positions: sitting, standing, and reclining/lying down. Because the screen of a laptop is usually very close to the keyboard, users must angle their neck downward toward their hands to view the laptop screen as they type. Angling the neck downward for extended periods of time can cause discomfort and can ultimately lead to chronic physical problems over time. Various products are available which attempt to address these problems.

Desktop stands are designed to elevate the height of a laptop screen on a desk or table such that the laptop is approximately at eye level. Such devices can allow users to view their laptop screen at an improved viewing angle, thereby improving posture. However, desktop stands are generally not portable and cannot be used while standing or lying down.

Bed or cushion stands, which provide a support surface for a laptop while a user is reclined on furniture, such as a bed or a sofa, suffer from various limitations. First, the angle that a user is able to incline the laptop is limited by a restraining lip which protrudes from the laptop resting surface. This only prevents the laptop from sliding down, so beyond a certain angle the laptop will tip forward toward the user. Thus, the user is unable to lie completely flat while using the laptop. Second, the legs of these stands are typically joined to the laptop resting surface of the stand in only two places. This makes for easier folding, but a less stable standing configuration on an uneven surface, like a bed or sofa. Third, even when folded down, these stands are far too big to fit inside a standard laptop bag.

A third common product design is a modified/standing desk, which is designed to allow a user to stand while using a laptop and thus overcome the limitation of only being able to sit at a standard height desk. These products can be very expensive and have two primary limitations. First, not only are they not portable, but they generally are immovable without a second person. Second, they are limited to sitting and standing—they cannot be used when reclining or lying flat.

Therefore, what is needed is a device for holding portable electronics that is configured for use while sitting, standing, and lying down and is also portable.

BRIEF SUMMARY OF THE DISCLOSURE

The present disclosure provides a device for holding portable electronics. The device may comprise a base, a plurality of legs rotatably connected to the base, and a platform rotatably connected to the base via at least one first hinge. The platform may be configured to receive an electronic device and to pivot about the at least one first hinge between a level position and an inclined position. The device of the present disclosure may further comprise a retractable grip connected to the platform and configured to move between a retracted position and an extended position outside of the platform. In the extended position, at least one contact of the retractable grip may be configured to provide a bias force to an upper surface of the electronic device, such that at least a portion of the electronic device is disposed between the platform and the at least one contact.

According to an embodiment of the present disclosure, the retractable grip may include a pair of arms rotatably connected to the platform via at least one second hinge. The at least one contact of the retractable grip maybe a finger on each arm of the pair of arms. The finger may be located distally from the at least one second hinge and extend away from a front end of the platform. The at least one second hinge may be a torque hinge configured to supply the bias force to each finger of the pair of arms.

According to an embodiment of the present disclosure, the platform may include an aperture, and when moving the retractable grip from the retracted positon to the extended position, at least a portion of the retractable grip passes through the aperture.

According to an embodiment of the present disclosure, the plurality of legs may include a first pair of legs and a second pair of legs, each configured to rotate from an upright position to a storage positon. In the upright position, the first pair of legs and the second pair of legs may be rotated away from the base to support the device on a surface. In the storage position, the first pair of legs and the second pair of legs may be rotated to a position adjacent the base. Each leg of the first pair of legs may be spaced at a first distance, and each leg of the second pair of legs may be spaced at a second distance. The first distance may be greater than the second distance, such that in the storage position the second pair of legs may be positioned between the first pair of legs. In the storage position, a majority length of the first pair of legs and a majority length of the second pair of legs may be coplanar.

According to an embodiment of the present disclosure, a majority surface of the base may define a base plane, and a majority length of each leg of the plurality of legs may be disposed at an angle of 10° to 17.5° relative to the base plane.

According to an embodiment of the present disclosure, a majority surface of the platform may define a platform plane, and in the inclined position the platform may be at an angle relative to the base plane between 55° and 75°.

According to an embodiment of the present disclosure, the base may include a first plurality of openings and the platform may include a second plurality of openings. The first plurality of openings may align with at least some of the second plurality of openings.

According to an embodiment of the present disclosure, a major surface of the platform may be parallel to a major surface of the base in the level position.

According to an embodiment of the present disclosure, the at least one first hinge may be a torque hinge.

According to an embodiment of the present disclosure, the base may include a first curved side and a second curved side, located opposite one another. Leg hinges of the plurality of legs may lie along the first curved side and the second curved side. One of the curved sides may have an arc length that is greater than the other curved side.

According to an embodiment of the present disclosure, each leg of the plurality of legs may be aluminum.

According to an embodiment of the present disclosure, the device may further comprise a restraining strap. The restraining strap may have a first end secured to the underside o the platform and a second end secured to the electronic device.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
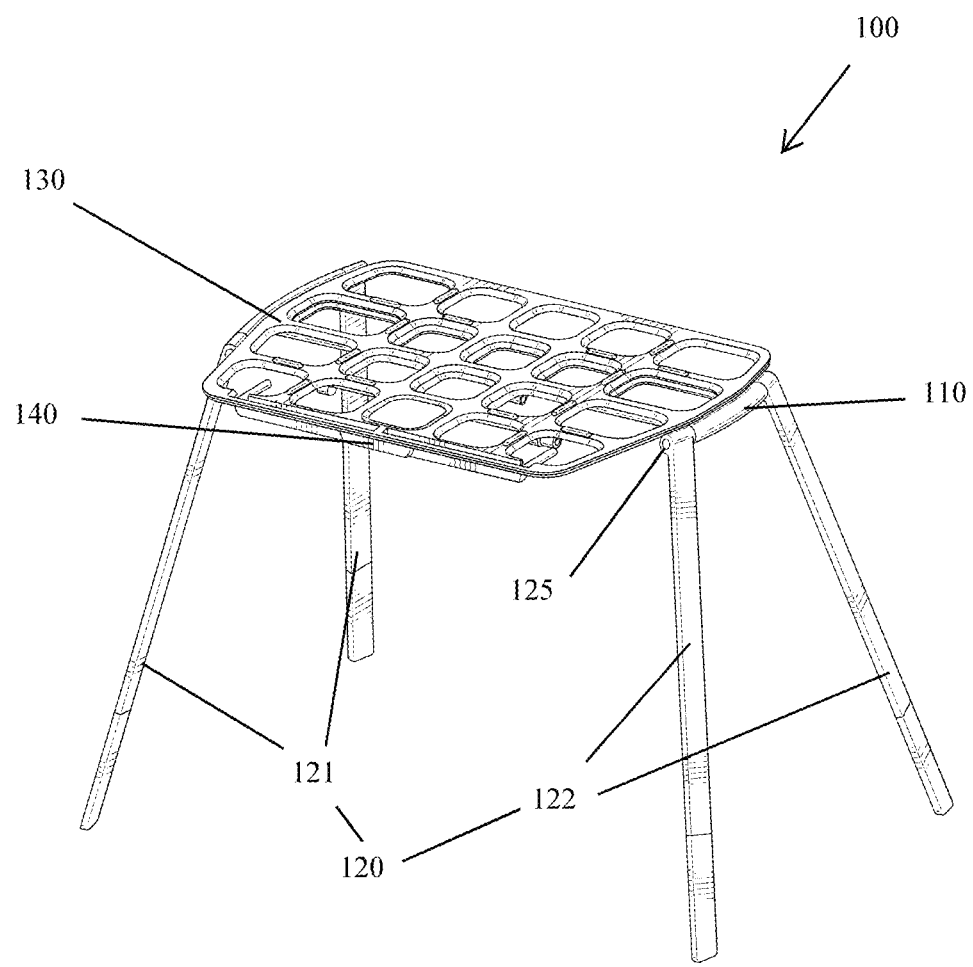
FIG. 1 depicts a device for holding portable electronics according to an embodiment of the present disclosure.

Referring to FIG. 1, the present disclosure provides a device for holding portable electronics 100. The device 100 may be configured for use while sitting, standing, or lying down. Accordingly, the device 100 may be placed on a desk, table, or countertop for use while sitting or standing, or it may be placed on a bed, sofa, or recliner for use while reclined or lying down. The device 100 may also be highly portable. The device 100 may generally include a base 110, a plurality of legs 120, a platform 130, and a retractable grip 140.

Figure 2:
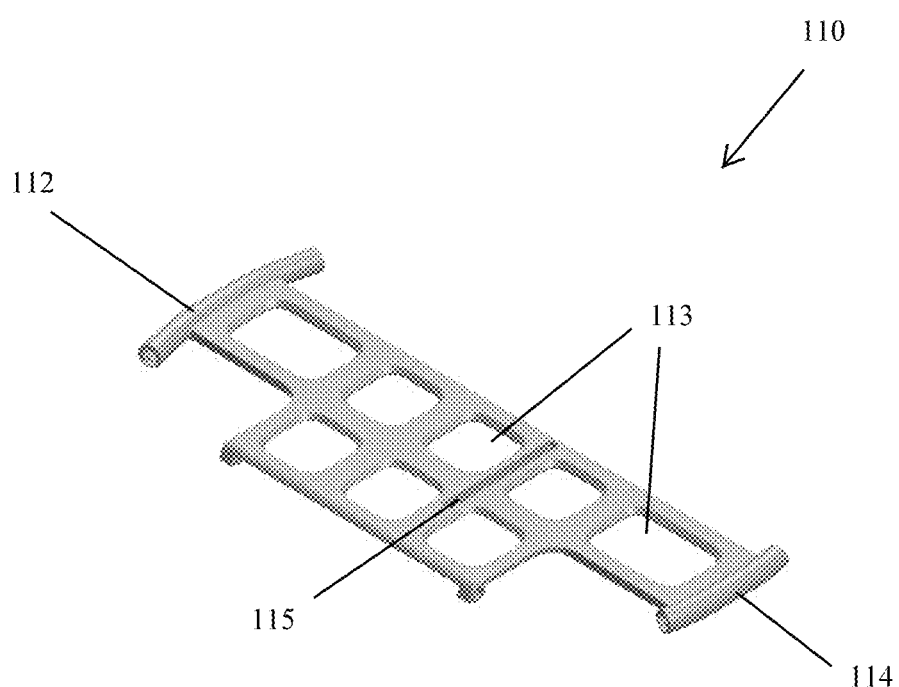
FIG. 2 depicts a base of the device of the present disclosure.

FIG. 2 illustrates an embodiment of a base 110 of the present disclosure. The base 110 may include a front end and a rear end. The front end may be narrower than the rear end. In an embodiment of the present disclosure, the base 110 may include a first curved side 112 and a second curved side 114, located opposite one another. One of the curved sides may have an arc length that is greater than the other curved side.

Referring back FIG. 1, the device 100 may comprise a plurality of legs 120. The plurality of legs 120 may be rotatably connected to the base 110. Specifically, the plurality of legs 120 may be rotatable from an upright position to a storage position. In the upright position, shown in FIG. 1, the plurality of legs 120 may be rotated away from the base 110 to support the device 100 on a surface. In the storage position, shown in FIGS. 5-7, the plurality of legs 120 may be rotated to a position adjacent the base 110.

Figure 3:
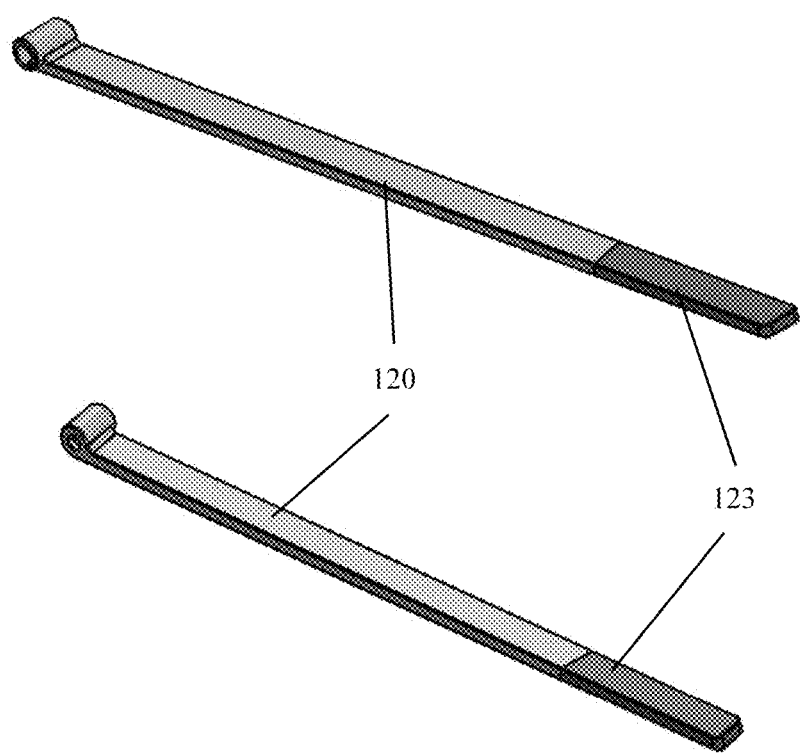
FIG. 3 depicts a pair of legs of the device of the present disclosure.
Figure 4:
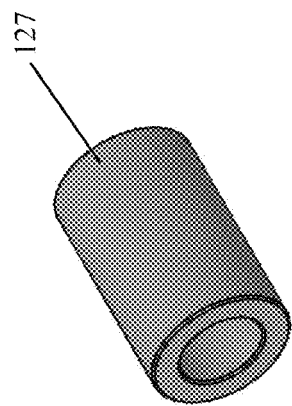
FIG. 4 depicts a hinge pivot and a bearing sleeve of the leg hinge of the present disclosure.
Figure 4:
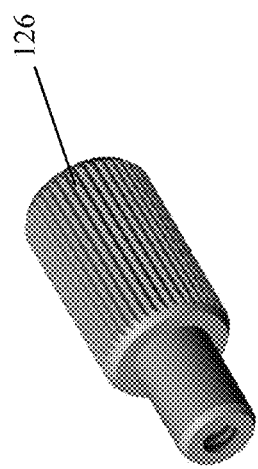

Two of the plurality of legs 120 are shown in FIG. 3. Each of the plurality of legs 120 may be rotatably connected to the base 110 via a leg hinge 125. Each leg hinge 125 may comprise a hinge pivot 126 and a bearing sleeve 127 rotatable relative to the hinge pivot 126. In an embodiment of the present disclosure, each hinge pivot 126 may be provided on the base 110 and each bearing sleeve 127 may be provided on each leg 120. Each leg hinge 125 may be provided at the ends of the first curved side 112 and the second curved side 114 of the base 110. Each of the plurality of legs 120 may comprise a foot 123. Each foot 123 may be located at the end of each leg 120 distal from the base 110. Each foot 123 may prevent slipping of the device 100 on hard surfaces. FIG. 4 illustrates an embodiment of a hinge pivot 126 and corresponding bearing sleeve 127 of a leg hinge 125.

Referring back to FIG. 1, the device 100 may comprise a first pair of legs 121 and a second pair of legs 122. The first pair of legs 121 and the second pair of legs 122 may be rotatably connected to opposite ends of the base 110. Each leg 120 may rotate individually with the base. Alternatively, each pair of legs 121, 122 may rotate together. Each leg of the first pair of legs 121 may be spaced at a first distance. Each leg of the second pair of legs 122 may be spaced at a second distance. In an embodiment of the present disclosure, the first distance may be greater than the second distance.

Figure 5:
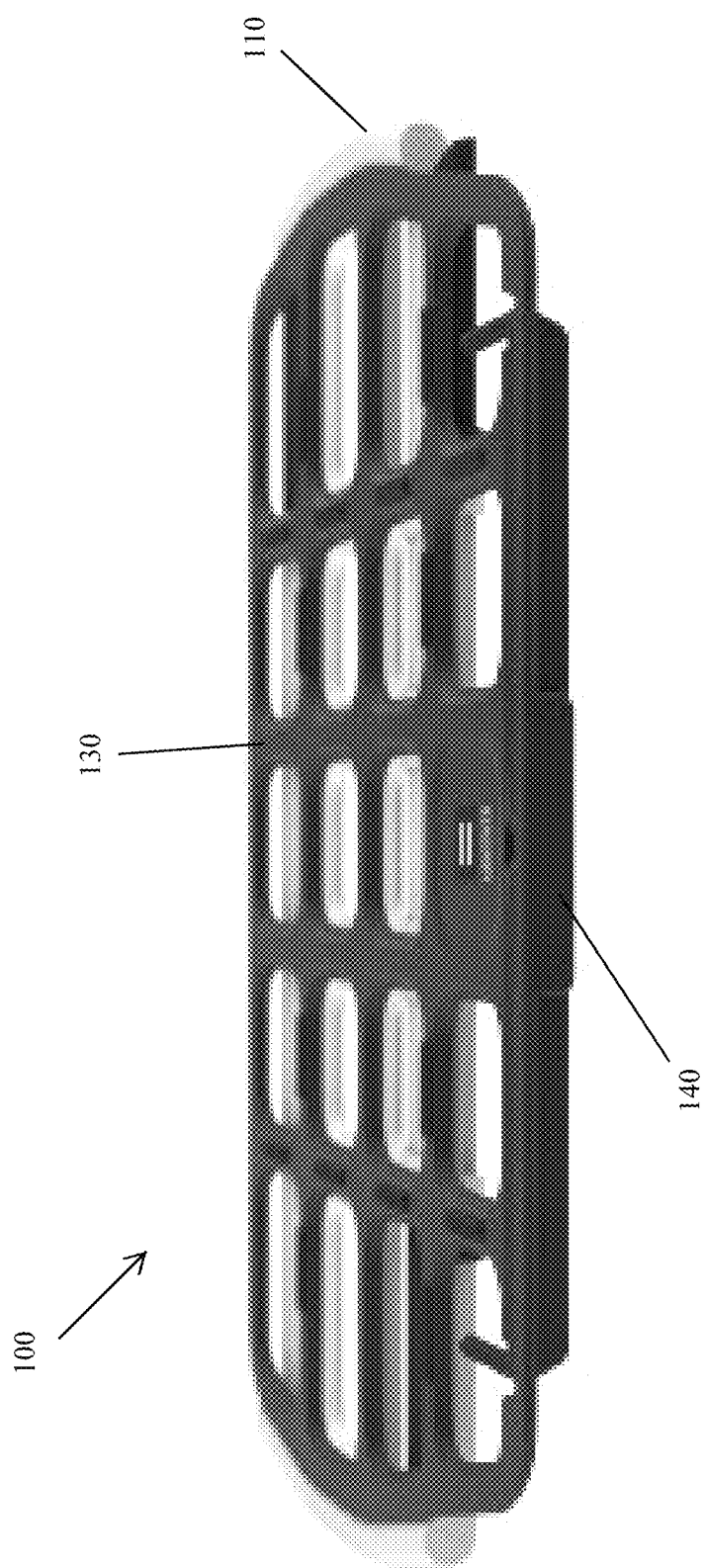
FIG. 5 depicts the device having the plurality of legs in a storage position.
Figure 7:
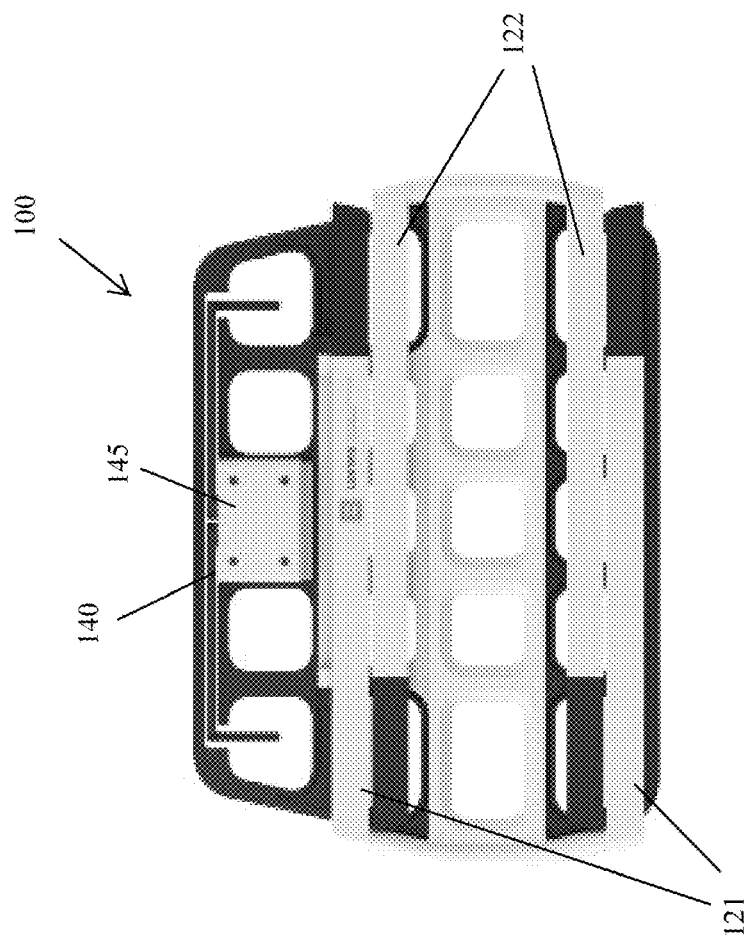
FIG. 7 depicts a bottom view of the device having the plurality of legs in a storage position.
Figure 6:
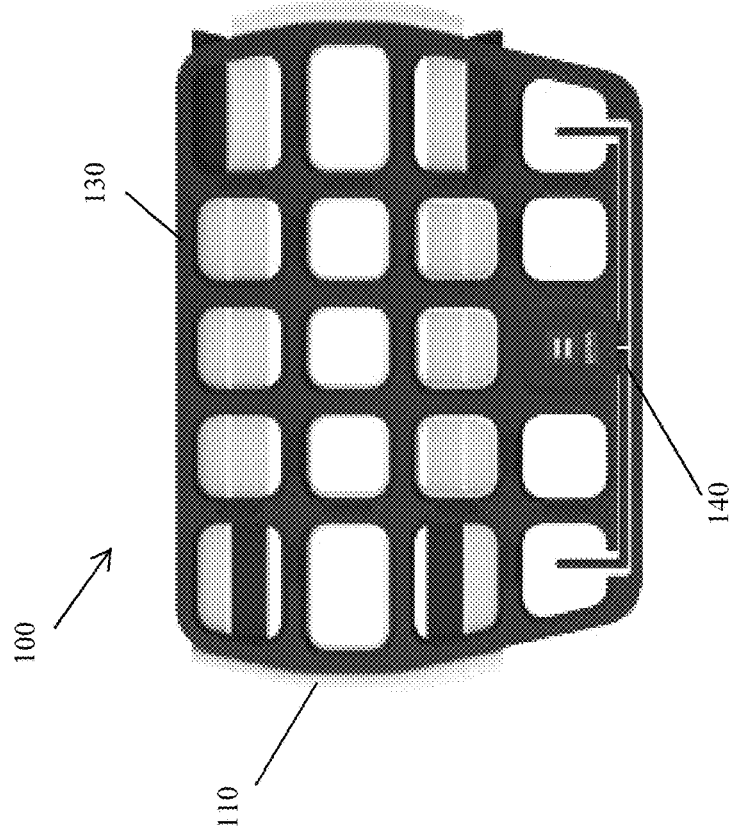
FIG. 6 depicts a top view of the device having the plurality of legs in a storage position.

In an embodiment of the present disclosure shown in FIGS. 5-7, the second pair of legs 122 may be positioned between the first pair of legs 121 in the storage position. For example, a majority length of the first pair of legs 121 and a majority length of the second pair of legs 122 may be coplanar in the storage position.

Figure 8:
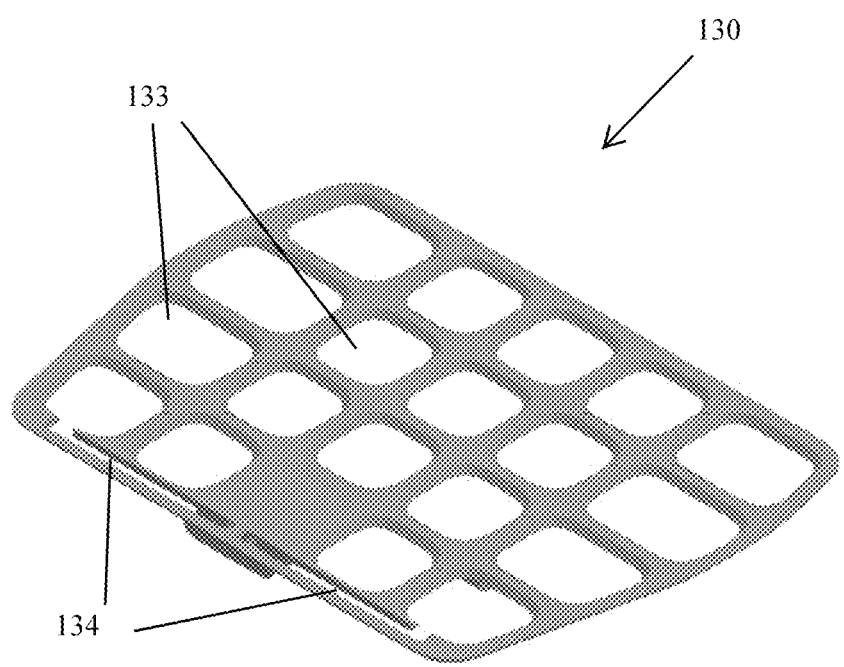
FIG. 8 depicts a platform of the device of the present disclosure.

The device 100 may comprise a platform 130. FIG. 8 illustrates an embodiment of a platform 130 of the present disclosure. The platform 130 may be configured to receive an electronic device 200. For example, the platform 130 may be configured to receive a laptop computer. The platform 130 may be configured to receive other electronic devices, and is not limited to those described herein.

Figure 10:
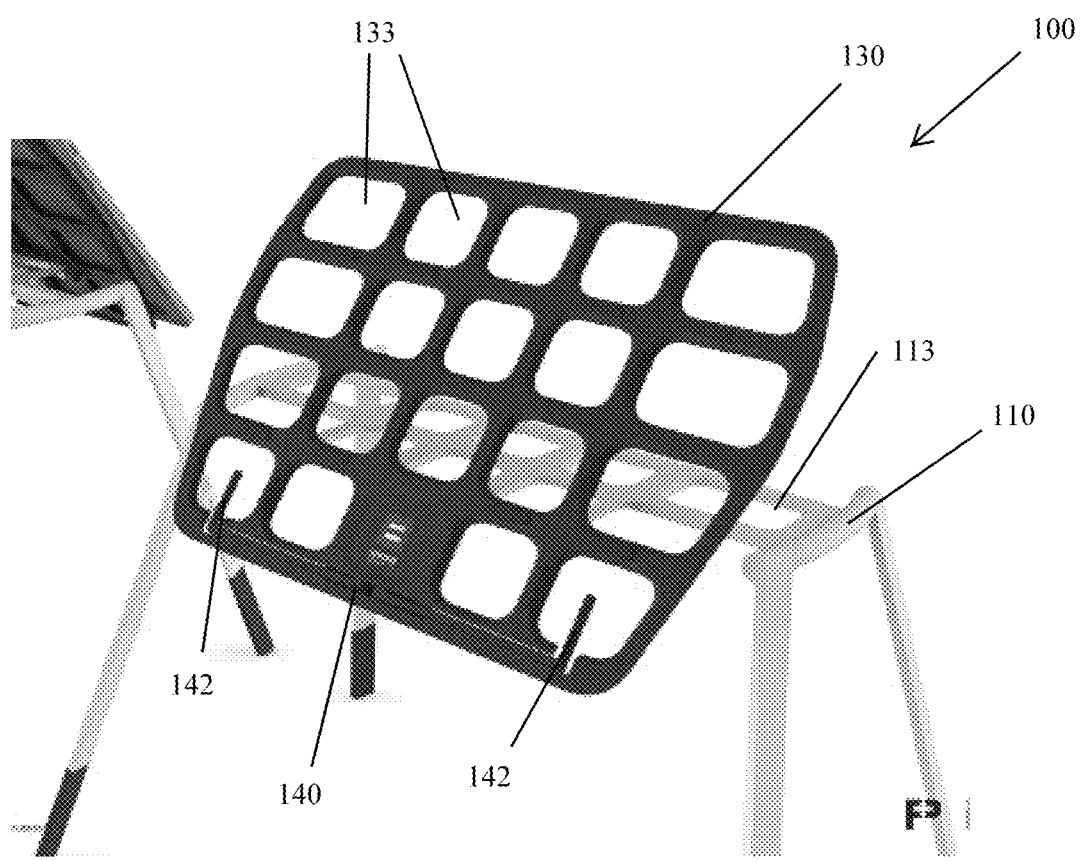
FIG. 10 depicts the device in an inclined position.
Figure 11:
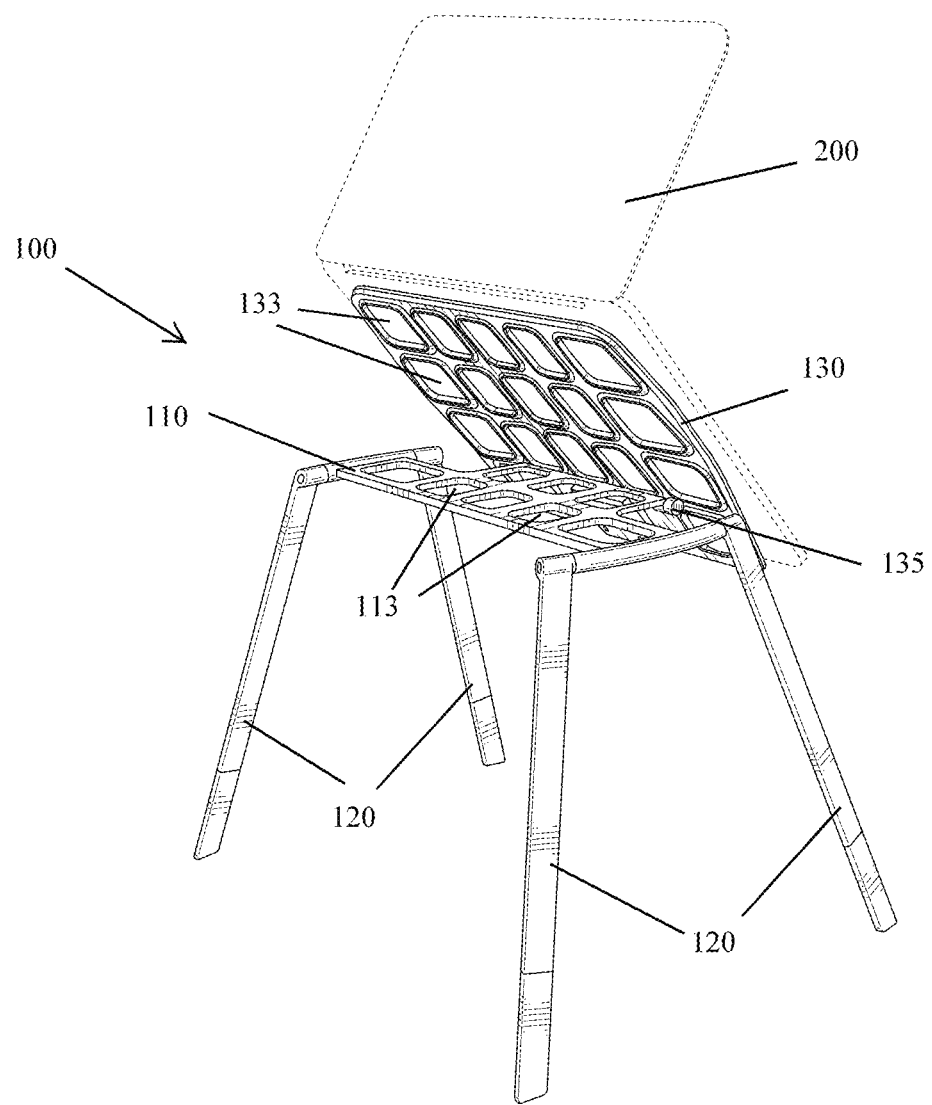
FIG. 11 depicts the device holding an exemplary portable electronic device, with the device in an inclined position.
Figure 12:
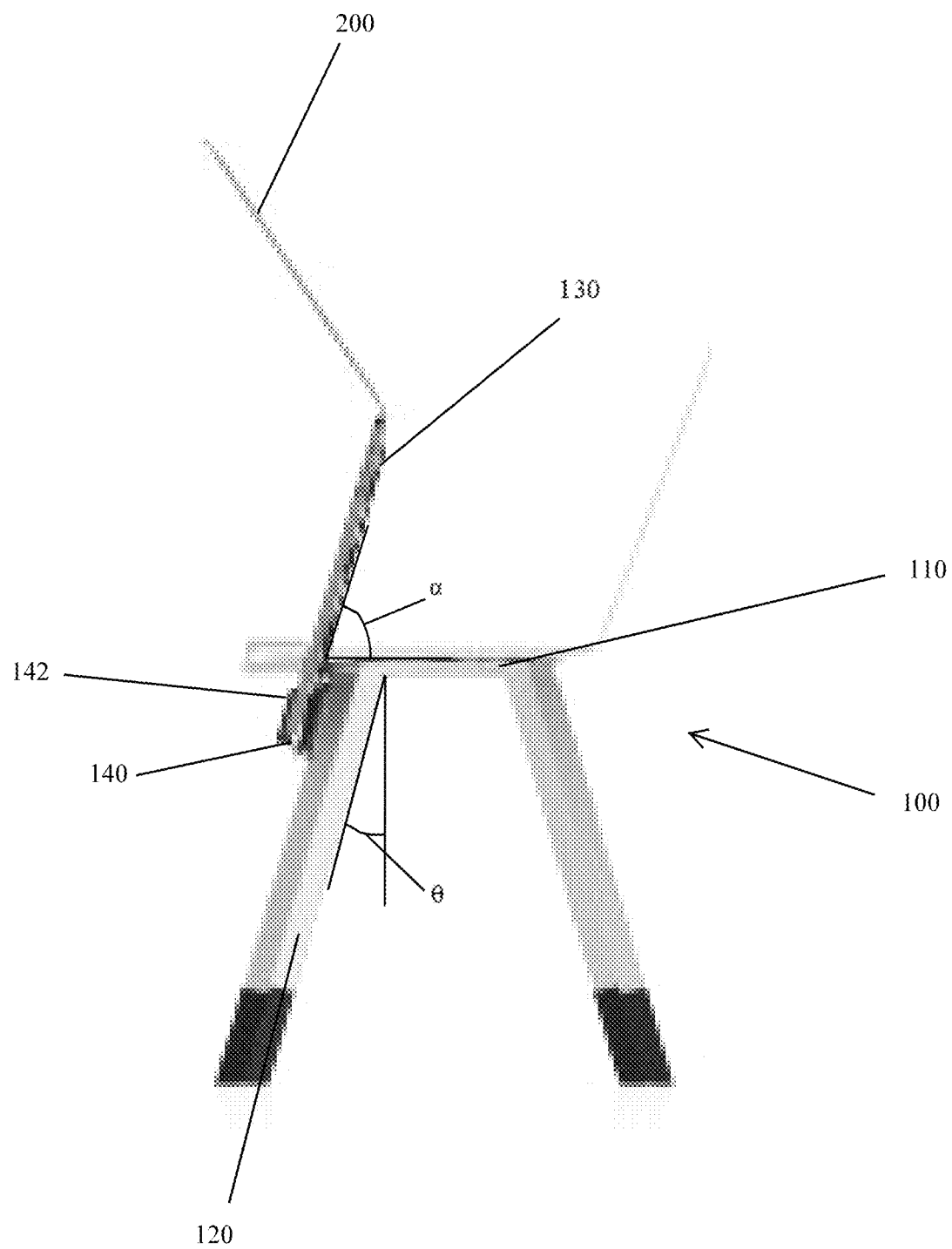
FIG. 12 also depicts the device holding an exemplary portable electronic device, with the device in an inclined position.
Figure 13:
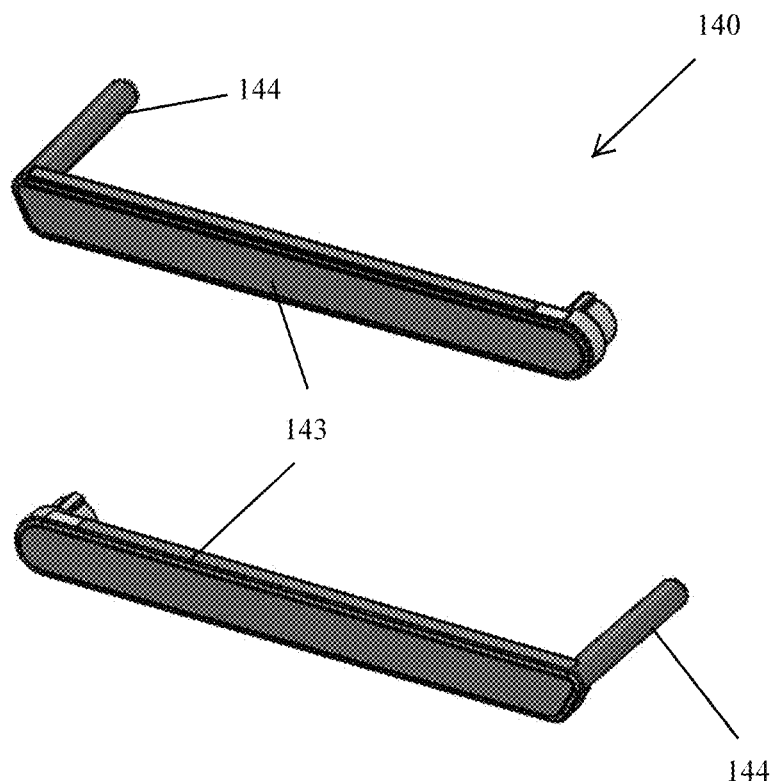
FIG. 13 depicts a pair of arms of the retractable grip of the present disclosure.

The platform 130 may be rotatably connected to the base 110 via at least one first hinge 135. The at least one first hinge 135 may be a torque hinge. Specifically, the first hinge 135 may have a torque between Z1 and Z2. The platform 130 may be configured to pivot about the at least one first hinge 135 between a level position, as shown in FIG. 1, and an inclined position, as shown in FIGS. 10-12. The at least one first hinge 135 may comprise a hinge pivot 136 and a bearing sleeve 137 rotatable relative to the hinge pivot 136. In an embodiment of the present disclosure, the hinge pivot 136 may be provided on the base 110 and the bearing sleeve 137 may be provided on platform 130.

Figure 9:
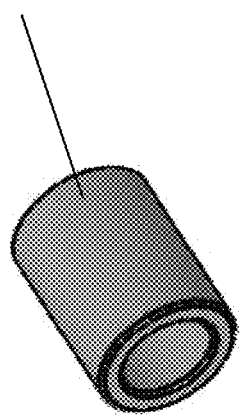
FIG. 9 depicts a hinge pivot and a bearing sleeve of the at least one first hinge of the present disclosure.
Figure 9:
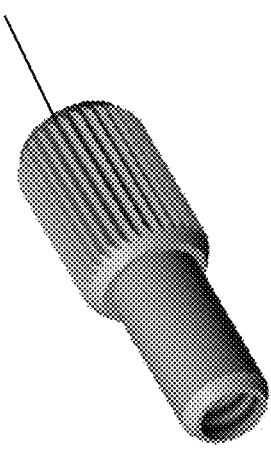

FIG. 9 illustrates an embodiment of a hinge pivot 136 and corresponding bearing sleeve 137 of a first hinge 135. In an embodiment of the present disclosure, the device 100 includes two first hinges 135, each comprising a hinge pivot 136 and a bearing sleeve 137. The two hinge pivots 136 may be disposed at the front end of the base 110. The two bearing sleeves 137 may be disposed on the underside of the platform 130. Each hinge pivot 136 and bearing sleeve 137 may join such that the platform 130 may be rotatable relative to the base 110.

Referring to FIGS. 10 and 11, the base 110 may comprise a first plurality of openings 113 and the platform 130 may comprise a second plurality of openings 133. The first plurality of openings 113 may be equally spaced over the entire base 110, and the second plurality of openings 133 may be equally spaced over the entire platform 130. The first plurality of openings 113 in the base 110 may align with at least some of the second plurality of openings 133 in the platform 130. With the first and second plurality of openings 113, 133 provided in the device 100 of the present disclosure, an electronic device 200 may easily ventilate and dissipate heat through the platform 130 and base 110.

Referring to FIG. 12, a major surface of the base 110 may define a base plane and a major surface of the platform 130 may define a platform plane. In the level position, the platform plane may be parallel to the base plane. For example, in the level position, the platform 130 and the base 110 may be positioned such that the platform 130 is resting on top of the base 110. Alternatively, in the level position, the platform 130 and the base 110 may be positioned such that the platform 130 is spaced apart from the base 110. In the inclined position, the platform plane may be at an angle $\alpha$ relative to the base plane. For example, the platform plane may be at an angle $\alpha$ between 55° and 75° degrees relative to the base plane. However, other angles may be possible.

In an embodiment of the present disclosure, a majority length of each leg of the plurality of legs 120 may be disposed at an angle $\theta$ relative to the base plane, as shown in FIG. 12. For example, each leg of the plurality of legs 120 may be disposed at angle $\theta$ between 10° and 17.5° relative to the base plane. In a specific embodiment, each leg of the plurality of legs 120 may be disposed at an angle $\theta$ of 12.5° or 15°. With the device 100 of the present disclosure, the plurality of legs 120 may provide a wide stance for improved stability on soft or uneven surfaces.

Figure 15:
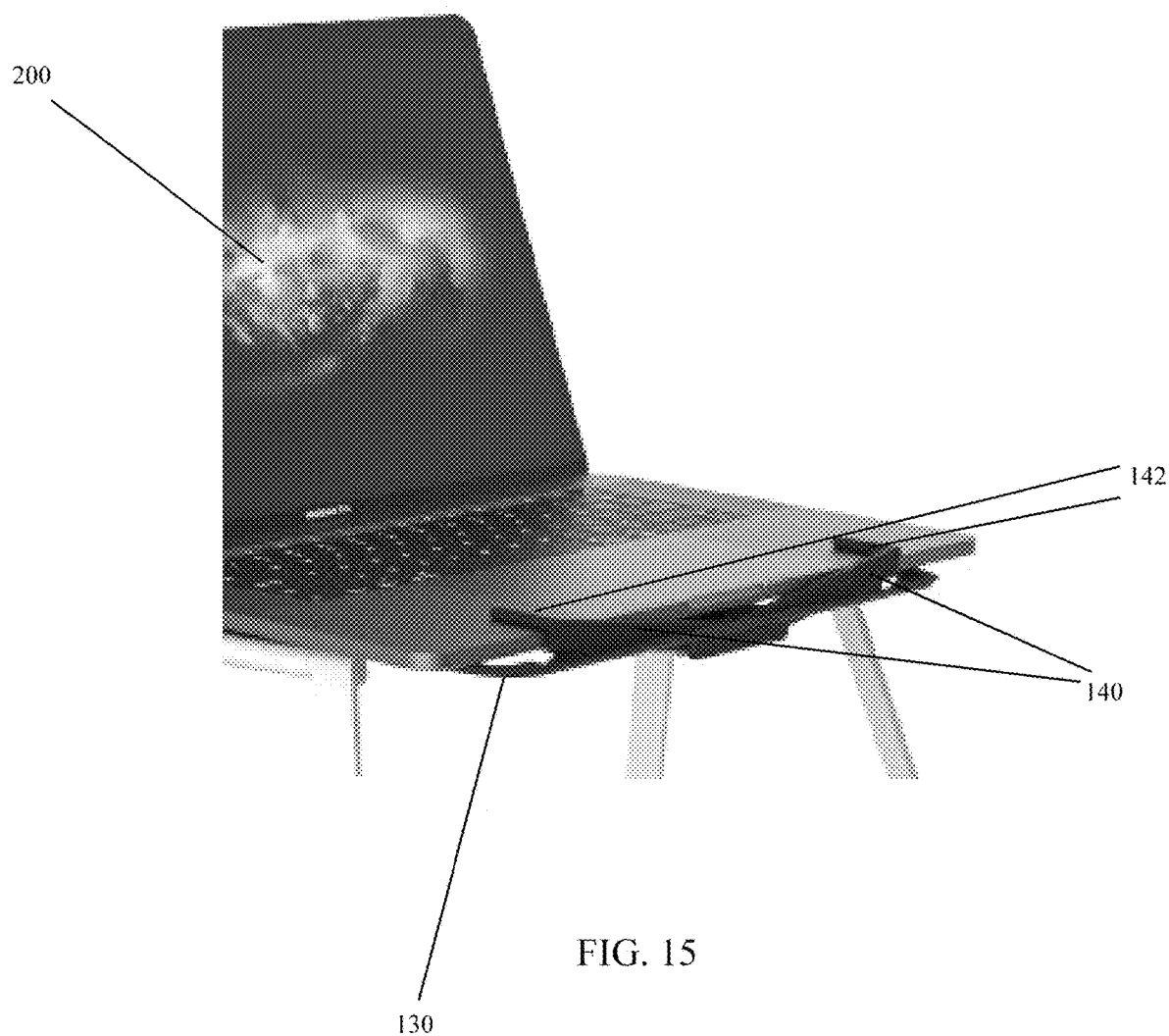
FIG. 15 depicts the device holding an exemplary portable electronic device, with the retractable grip in an extended position.

The device 100 may comprise a retractable grip 140. The retractable grip 140 may be connected to the platform 130. The retractable grip 140 may be configured to move between a retracted position, as shown in FIG. 10, and an extended position, as shown in FIG. 15. In the extended position, at least one contact 142 of the retractable grip 140 may be configured to provide a bias force to an upper surface of the electronic device 200 such that at least a portion of the electronic device 200 is disposed between the platform 130 and the at least one contact 142.

In an embodiment of the present disclosure, the retractable grip 140 may pass through an aperture 134 located in the platform 130 when moving from the retracted position to the extended position. For example, the aperture 134 may be substantially the same shape as the retractable grip 130.

Figure 16:
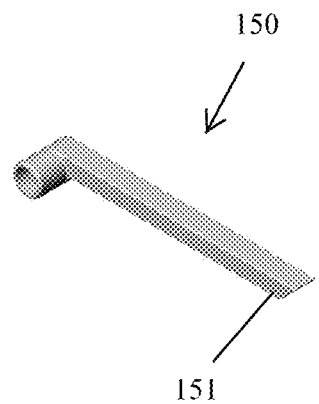
FIG. 16 depicts a support member of the device of the present disclosure.

In an embodiment of the present disclosure, the retractable grip 140 may include a pair of arms 143. A pair of arms 143 are shown in FIG. 16. The pair of arms 143 may be rotatably connected to the platform 130 via at least one second hinge 145. The second hinge 145 may be a torque hinge. The second hinge 145 may be configured to supply bias force to the at least one contact 142 of the pair of arms 143. The second hinge 145 may comprise a hinge pivot 146 and a bearing sleeve 147 rotatable relative to the hinge pivot 146. In an embodiment of the present disclosure, each hinge pivot 146 may be provided on the base 110 and each bearing sleeve 147 may be provided on each arm 143.

Figure 14:
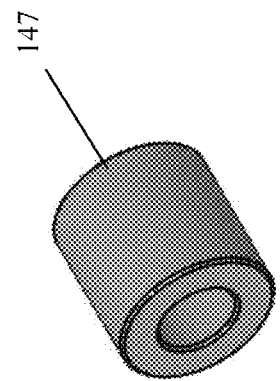
FIG. 14 depicts a hinge pivot and a bearing sleeve of the at least one second hinge of the present disclosure.
Figure 14:
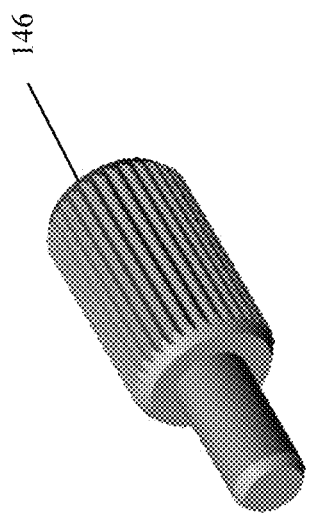

FIG. 14 illustrates an embodiment of a hinge pivot 146 and corresponding bearing sleeve 147 of a second hinge 145. In an embodiment of the present disclosure, the device 100 includes two second hinges 145, each comprising a hinge pivot 146 and a bearing sleeve 147. The two hinge pivots 146 may be disposed at the front end of the platform 130 on the underside. Each of the two bearing sleeves 147 may be disposed on one of arm of the pair of arms 143. Each hinge pivot 146 and bearing sleeve 147 may join such that the pair of arms 143 may be rotatable relative to the platform 130.

In an embodiment of the present disclosure, the at least one contact 142 may be a finger 144 on each arm of the pair of arms 143. The finger 144 may be located distally from the at least one second hinge 145, and extend away from a front end of the platform 130.

Referring to FIG. 16, the device 100 may further comprise a support member 150. The support member 150 may be rotatably connected to the base 110. The support member 150 may be rotated such that a distal end 151 of the support member 150 is away from the base 110. The support member may be positioned within an aperture 115 of the base 110. The aperture 115 of the base 110 may be located between the first plurality of openings 113 in the base 110.

In an embodiment of the present disclosure, when the platform 130 is in the inclined position, the support member 150 may be rotated such that the distal end 151 of the support member 150 contacts the platform 130. When the support member 150 contacts the platform 130, it prevents rotation of the platform 130 to the level position. This allows the platform 130 to stay in the inclined position when holding an electronic device 200 that would be otherwise too heavy to keep in the inclined position.

Figure 17:
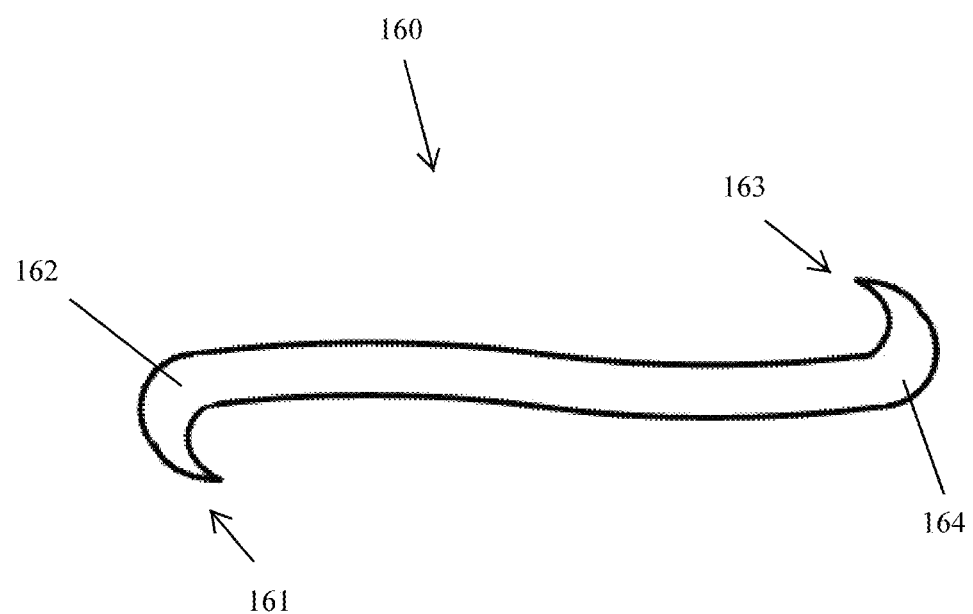
FIG. 17 depicts a restraining strap of the device of the present disclosure.

Referring to FIG. 17, the device 100 may further comprise a restraining strap 160. The restraining strap 160 may have a first end 161 secured to the underside of the platform 130. For example, the first end 161 may include a first hook 162 that may be used to secure to the underside of the platform 130. The restraining strap 160 may have a second end 163 secured to the electronic device 200. For example, the second end 163 may include a second hook 164 that may be used to secure to the electronic device 200. The second end 163 may be secured to any portion of the electronic device 200. For example, the second end 163 may be secured to an upper edge, side edge, upper corner, or bottom of the electronic device 200.

According to an embodiment of the present disclosure, the device 100 may comprise a pair of restraining straps 160. Each restraining strap 160 may have a first end 161 secured to the underside of the platform 130, and a second end 163 secured to the electronic device 200. For example, second end 163 of each restraining strap 160 may be secured to opposite sides or upper corners of the electronic device 200.

The restraining strap 160 may be stretchable. For example, the restraining strap 160 may be a bungee. The restraining strap 160 may have a length between 1 in. and 2 in. With the restraining strap 160 provided by the present disclosure, the electronic device 200 may be prevented from tipping forward off of the platform 130 when at an extreme angle.

According to an embodiment of the present disclosure, the device for holding portable electronics 100 may be configured for ergonomic use of a laptop while sitting, standing, and lying down. While sitting or standing, the device 100 elevates the laptop screen to the user's eye level. While reclining or lying down, the device 100 inclines the laptop for typing to maintain the user's line of sight. With the device 100 of the present disclosure, the user experiences reduced physical strain in the sitting, standing, and reclined positions, and gains the ability to use a laptop while lying completely flat.

According to an embodiment of the present disclosure, the device for holding portable electronics 100 may have improved stability on various surfaces. The plurality of legs 120 may have a wide stance, which reduces the chance of tipping. In addition, the device 100 may comprise four legs 120, which are optimal for balance on soft, uneven surfaces, such as a bed or a sofa. The plurality of legs 120 may each further include a foot 123, which improve stability of the device 100 on hard surfaces.

According to an embodiment of the present disclosure, the device for holding portable electronics 100 may have high portability. Specifically, the device 100 may be thinner and lighter than a typical 15" laptop. The plurality of legs 120 and platform 130 of the device 100 may fold flat with the base 110, giving the device 110 a thin profile. With the device 100 of the present disclosure, the device 100 can easily be stored within a laptop bag next to a laptop. In addition, the device 100 may be constructed of lightweight materials. For example, the device 100 may be constructed of aluminum. This improves the portability of the device 100 and reduces the strain on the user while carrying the device 100. Likewise, the first plurality of openings 113 in the base 110 and the second plurality of openings 133 platform 130 may reduce the overall weight of the device 100. Moreover, the first and second plurality of openings 113, 133 may function as a handle for the device 100. Accordingly, the user can easily grip the device 100 while carrying it by wrapping their fingers through the first and second plurality of openings 113, 133.

Figure 18:
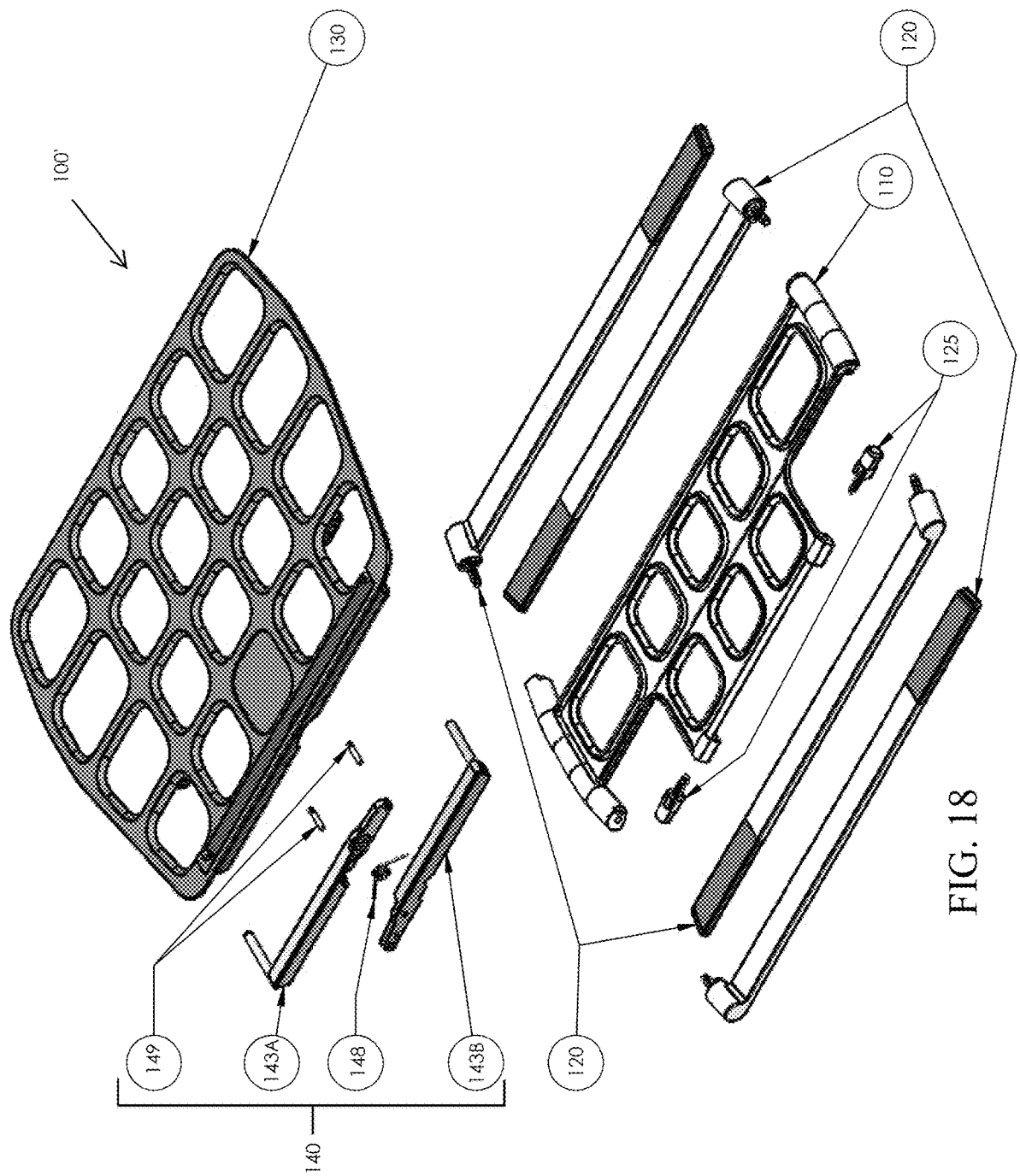
FIG. 18 depicts an exploded view of a device for holding portable electronics according to another embodiment of the present disclosure.

FIGS. 18-23 depict another embodiment according to the present disclosure, where the device for holding portable electronics 100' has a retractable grip 140 that is spring-biased. FIG. 18 is an exploded view of the device for holding portable electronics 100', which includes a base 110, a plurality of legs 120, leg hinges 125, a platform 130, and a retractable grip 140.

Figure 19:
FIG. 19 depicts bottom and sectional views of the device of the present disclosure.
Figure 19:
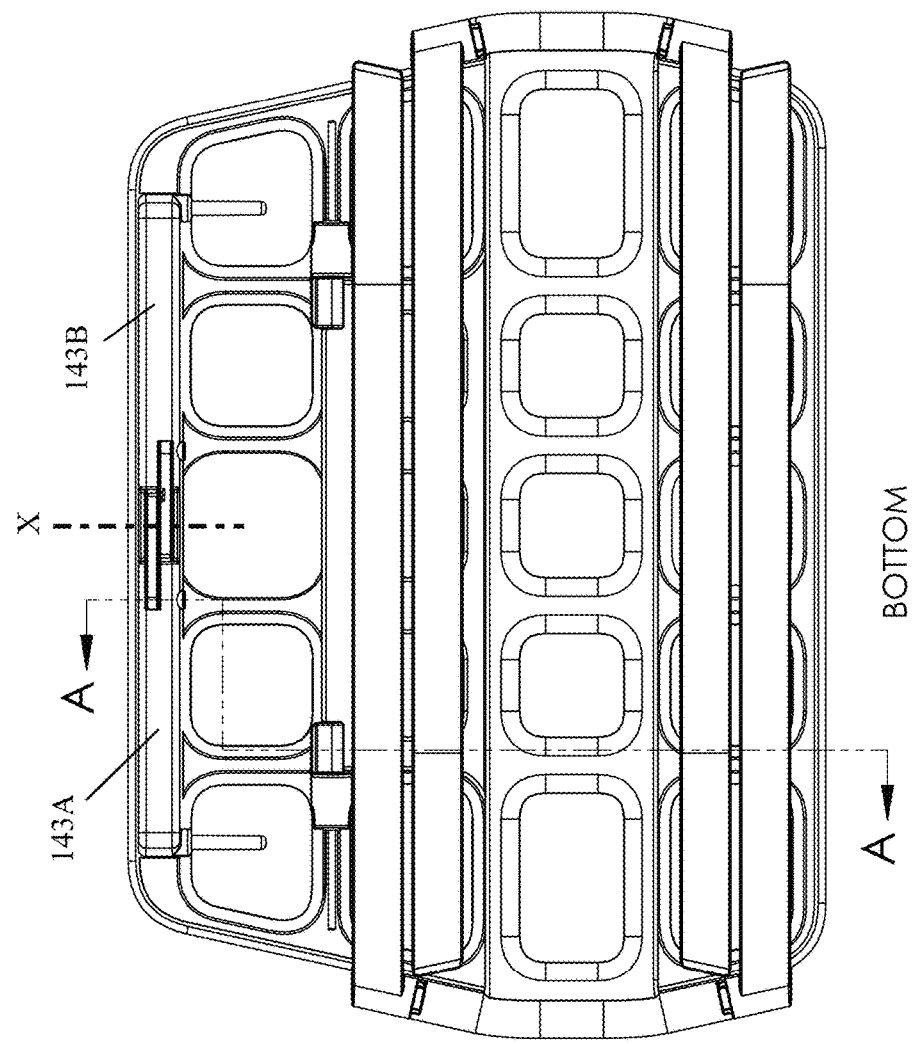

FIG. 19 depicts a bottom view and a sectional view (taken along A-A of the bottom view) showing the device 100' in the folded, storage position. As can be seen the retractable grip 140 includes two arms 143A and 143B. The arms 143A and 143B can rotate around a common rotational axis X.

Figure 20:
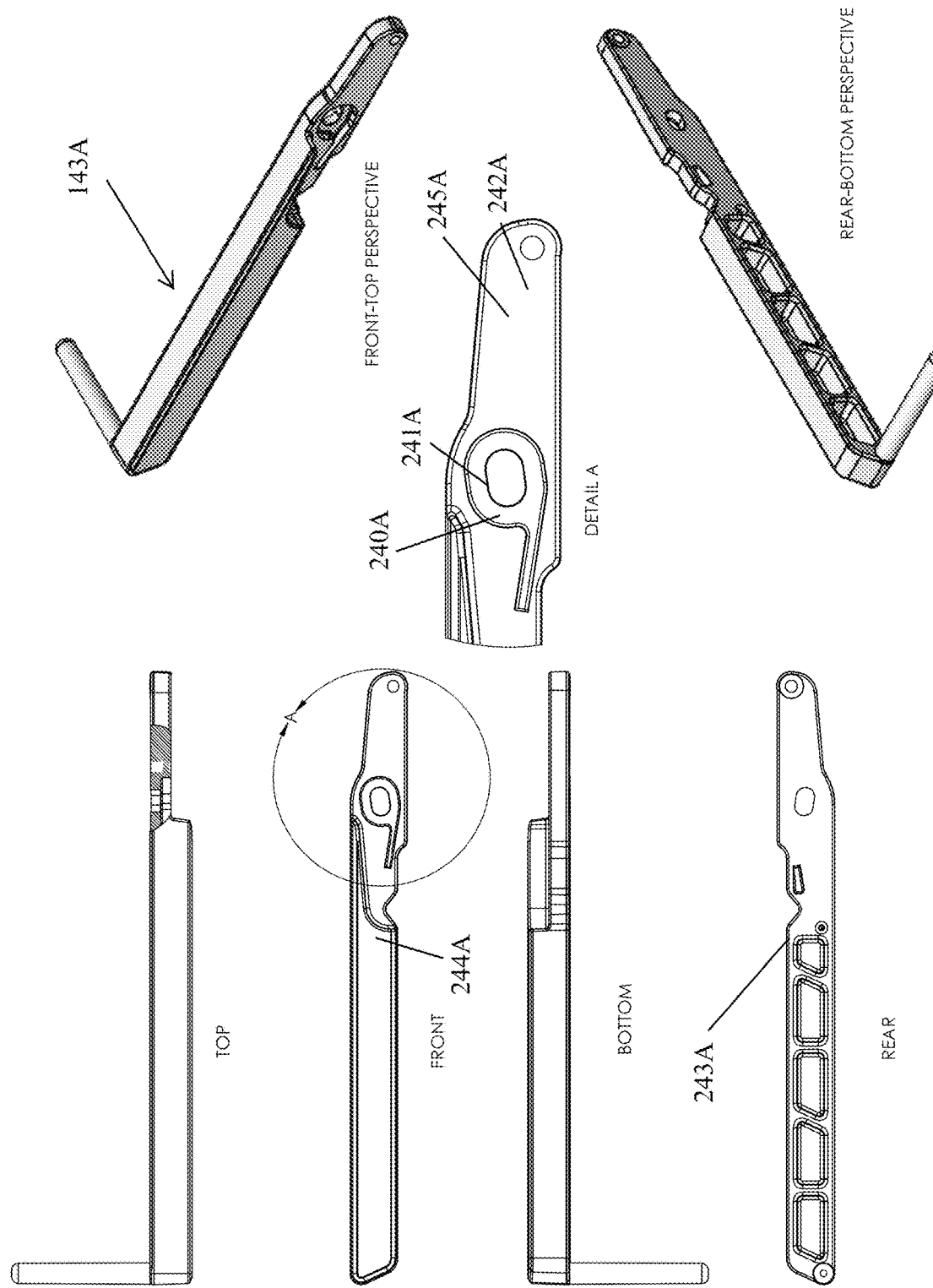
FIG. 20 depicts a left arm of the retractable grip of the device according to the present disclosure.
Figure 21:
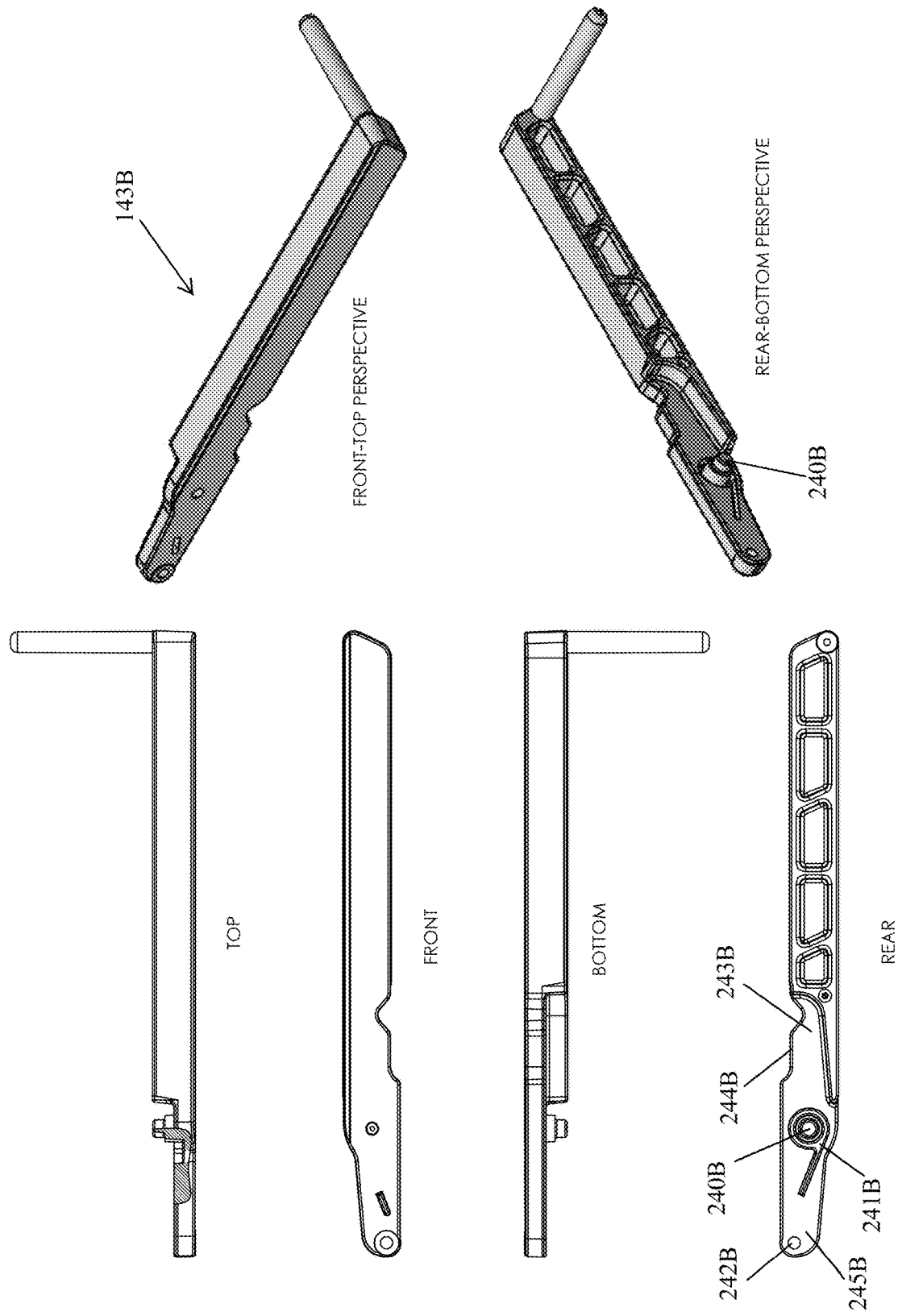
FIG. 21 depicts a right arm of the retractable grip of the device according to the present disclosure.

FIGS. 20 and 21 depict exemplary arms 143A, 143B according to an embodiment of the present disclosure. In FIG. 20, arm 143A can include aperture 240A, spring recess 241A, pin aperture 242A, a cam surface 243A, an end recess 244A, and an end portion 245A. In FIG. 21, arm 143B can include protrusion 240B, spring recess 241B, pin aperture 242B, a cam surface 243B, an end recess 244A, and an end portion 245B.

Figure 22:
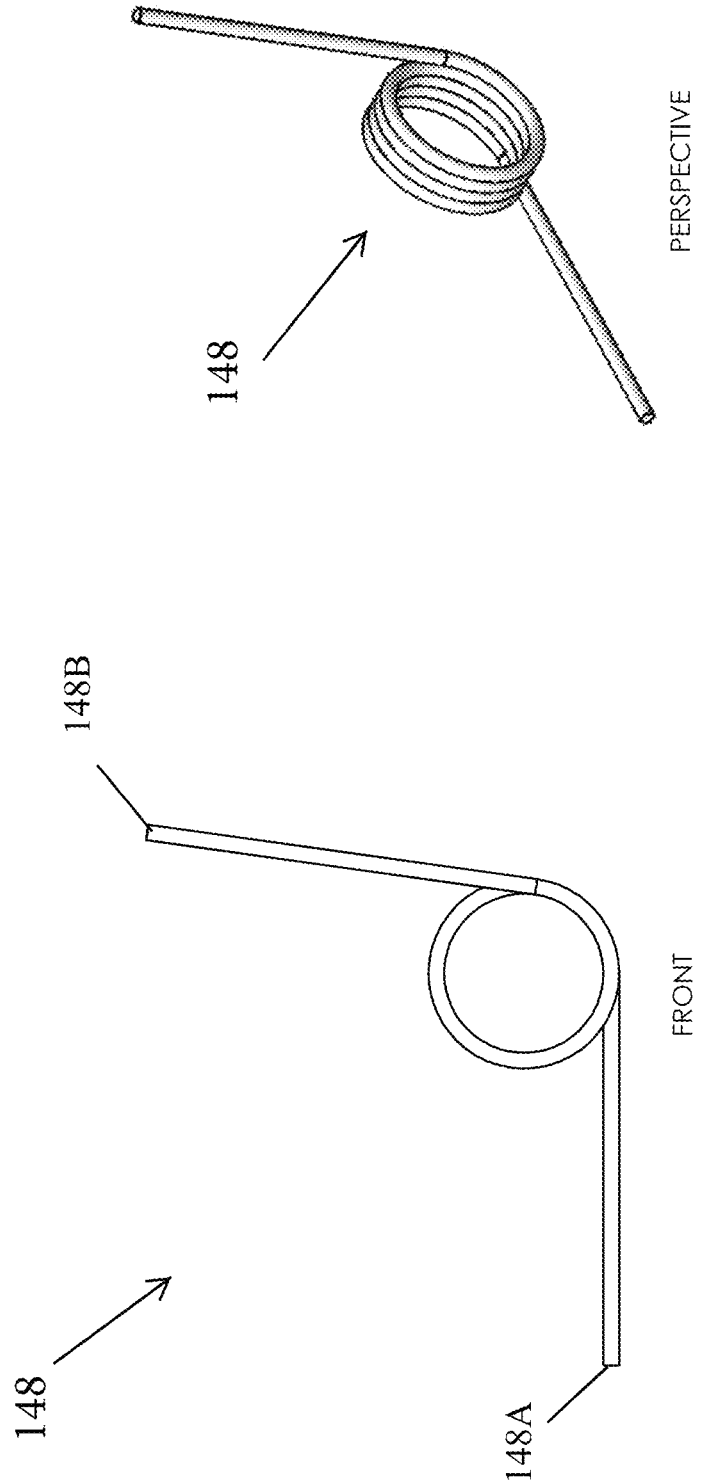
FIG. 22 depicts a spring according to an embodiment of the present disclosure.

FIG. 22 depicts an exemplary spring 148 to provide a spring biased for the retractable grip 140. In this example, the spring 148 is a torsion spring having ends that are disposed at an angle relative to one another. The angle between the ends may exceed 90°, for example, the angle may be between 95° and 101°. As will be understood to those having ordinary skill in the art, the spring 148 can be configured to provide a suitable amount of torque. For example, the spring 148 can provide a maximum torque of approximately 0.060 Nm.

Figure 23:
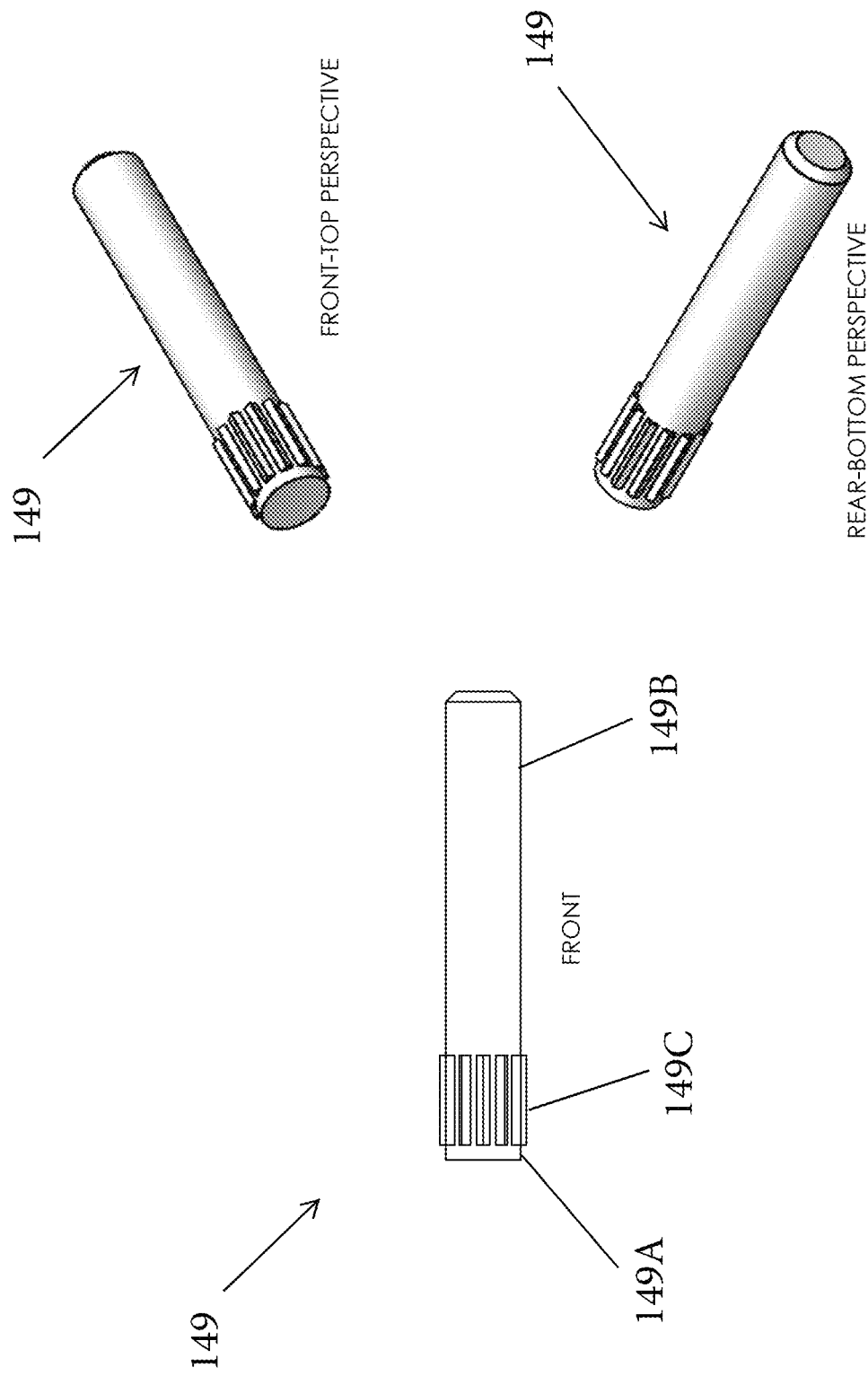
FIG. 23 depicts a pin according to an embodiment of the present disclosure.

FIG. 23 depicts an exemplary pin 149. The pin 179 can include a first end 149A and a second end 149B. The first end 149A can be received within a front portion of the platform 130. In order to rotationally fix the pin 149 relative to the platform 130, the first end 149A can include a plurality of teeth 149C.

In use, the arms 143A, 143B can mate with one another, and a spring 148 can be disposed therebetween. For example, protrusion 240B of arm 143B can be received within aperture 240A of arm 143A, and the spring 138 can be received within the respective spring recesses 241A, 241B between the arms 143A, 143B to apply a spring force to each arm. A first pin 149, fixed to the platform 130 can be disposed through pin aperture 242A and engage cam surface 244B. A second pin 149, fixed to the platform 130, can be disposed through pin aperture 242B and engage cam surface 244A. In the folded, storage position (e.g. of FIG. 19), end portion 245B of arm 143B is received within end recess 244A of arm 143A, and end portion 245A of arm 143A is received within end recess 244B of arm 143B. As the arms 143A, 143B rotate relative to one another, the pins 149 slide along respective cam surfaces 244A, 244B. In this way, the spring force applied by the fingers 144 to an electronic device can vary based upon the position of the fingers 144 relative to their respective rotational position and/or relative to the position of the fingers 144 relative to the platform 130.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A device for holding portable electronics, comprising:
a base;
a plurality of legs rotatably connected to the base;
a platform configured to receive an electronic device, the platform being rotatably connected to the base via at least one first hinge; and
a retractable grip connected to the platform and configured to move between a retracted position and an extended position outside of the platform, wherein in the extended position, at least one contact of the retractable grip is configured to provide a bias force to an upper surface of the electronic device such that at least a portion of the electronic device is disposed between the platform and the at least one contact;
wherein the platform is configured to pivot about the at least one first hinge between a level position and an inclined position;
wherein the retractable grip includes a pair of arms rotatably connected to the platform via at least one second hinge;
wherein the plurality of legs includes a first pair of legs and a second pair of legs that are each configured to rotate from an upright position to a storage position;

wherein in the upright position the first pair of legs and the second pair of legs are rotated away from the base to support the device on a surface; and wherein in the storage position the first pair of legs and the second pair of legs are rotated to a position adjacent the base.

2. The device of claim 1, wherein the at least one contact is a finger on each arm of the pair of arms located distally from the at least one second hinge, each finger extending away from a front end of the platform.

3. The device of claim 2, wherein the at least one second hinge is a torque hinge configured to supply the bias force to each finger of the pair of arms.

4. The device of claim 2, wherein the at least one second hinge includes a spring to supply the bias force to each finger of the pair of arms.

5. The device of claim 1, wherein when moving the retractable grip from the retracted position to the extended position, at least a portion of the retractable grip passes through an aperture located in the platform.

6. The device of claim 1, wherein each leg of the first pair of legs are spaced at a first distance and each leg of the second pair of legs are spaced at a second distance, the first distance being greater than the second distance; and wherein in the storage position, the second pair of legs are positioned between the first pair of legs.

7. The device of claim 1, wherein in the storage position, a majority length of the first pair of legs and a majority length of the second pair of legs are coplanar.

8. The device of claim 1, wherein a majority surface of the base defines a base plane, and a majority length of each leg of the plurality of legs is disposed at an angle of 10° to 17.5° relative to the base plane.

9. The device of claim 1, wherein a majority surface of the base defines a base plane and a majority surface of the platform defines a platform plane, and wherein in the inclined position the platform is at an angle relative to the base plane of between 55° and 75°.

10. The device of claim 1, wherein the base includes a first plurality of openings, the platform includes a second plurality of openings, and the first plurality of openings align with at least some of the second plurality of openings.

11. The device of claim 1, wherein in the level position a major surface of the platform is parallel to a major surface of the base.

12. The device of claim 1, wherein the at least one first hinge is a torque hinge.

13. The device of claim 1, wherein the base includes a first curved side and a second curved side, located opposite one another, wherein leg hinges of the plurality of legs lie along the first curved side and the second curved side.

14. The device of claim 13, wherein one of the curved sides has an arc length that is greater than the other curved side.

15. The device of claim 1, wherein each leg of the plurality of legs are aluminum.

16. The device of claim 1, further comprising a restraining strap having a first end and a second end, wherein the first end is secured to an underside of the platform and the second end is secured to the electronic device.

17. A device for holding portable electronics, comprising:
a base;
a plurality of legs rotatably connected to the base;
a platform configured to receive an electronic device, the platform being rotatably connected to the base via at least one first hinge; and
a retractable grip connected to the platform and configured to move between a retracted position and an extended position outside of the platform, wherein in the extended position, at least one contact of the retractable grip is configured to provide a bias force to an upper surface of the electronic device such that at least a portion of the electronic device is disposed between the platform and the at least one contact;
wherein the platform is configured to pivot about the at least one first hinge between a level position and an inclined position;
wherein the retractable grip includes a pair of arms rotatably connected to the platform via at least one second hinge; and
wherein the at least one contact is a finger on each arm of the pair of arms located distally from the at least one second hinge, each finger extending away from a front end of the platform.

18. A device for holding portable electronics, comprising:
a base;
a plurality of legs rotatably connected to the base;
a platform configured to receive an electronic device, the platform being rotatably connected to the base via at least one first hinge; and
a retractable grip connected to the platform and configured to move between a retracted position and an extended position outside of the platform, wherein in the extended position, at least one contact of the retractable grip is configured to provide a bias force to an upper surface of the electronic device such that at least a portion of the electronic device is disposed between the platform and the at least one contact;
wherein the platform is configured to pivot about the at least one first hinge between a level position and an inclined position;
wherein the retractable grip includes a pair of arms rotatably connected to the platform via at least one second hinge; and
wherein the base includes a first curved side and a second curved side, located opposite one another, wherein leg hinges of the plurality of legs lie along the first curved side and the second curved side.

* * * * *